(12) United States Patent
Mattern et al.

(10) Patent No.: US 9,902,066 B2
(45) Date of Patent: Feb. 27, 2018

(54) APPARATUS FOR AUTOMATED REMOVAL OF WORKPIECES ARRANGED IN A CONTAINER

(71) Applicant: Liebherr-Verzahntechnik GmbH, Kempten (DE)

(72) Inventors: Thomas Mattern, Rieden (DE); David Haenschke, Altusried (DE); Bernhard Riedmiller, Wertach (DE); Alois Mundt, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 2 days.

(21) Appl. No.: 13/968,471

(22) Filed: Aug. 16, 2013

(65) Prior Publication Data

US 2014/0052297 A1 Feb. 20, 2014

(30) Foreign Application Priority Data

Aug. 17, 2012 (DE) .................. 10 2012 016 537
Aug. 6, 2013 (DE) .................. 10 2013 013 114

(51) Int. Cl.
*B25J 9/16* (2006.01)
(52) U.S. Cl.
CPC .......... *B25J 9/1666* (2013.01); *B25J 9/1676* (2013.01); *G05B 2219/37567* (2013.01); *G05B 2219/40053* (2013.01)
(58) Field of Classification Search
CPC ........ G05B 2219/40053; B65G 63/004; B65G 1/137; B65G 2203/041; B65G 59/106; B65G 1/1373; B65G 2201/0202; B65G 2201/027; B65G 47/846; B65G 47/848
See application file for complete search history.

(56) References Cited

U.S. PATENT DOCUMENTS 4,937,759 A * 6/1990 Vold ...................... B25J 9/1602
  700/262
5,080,415 A * 1/1992 Bjornson ............... B25J 15/103
  294/119.1

(Continued)

FOREIGN PATENT DOCUMENTS

CN  101559597 A  10/2009
DE  36 20 391 C2  2/1991

(Continued)

OTHER PUBLICATIONS

German-language Search Report dated Apr. 22, 2013 with partial English translation (Eight (8) pages).

(Continued)

*Primary Examiner* — Ryan Rink
(74) *Attorney, Agent, or Firm* — Crowell & Moring LLP

(57) ABSTRACT

A device for automated removal of workpieces arranged in a container has a detector device, for the purpose of detecting the workpiece, and a picker, which can be moved via a robot arm having at least six axes, for picking and removing the workpieces from the container. The device also has controller for evaluating the data of the detector device, for path planning, and for controlling the robot arm and the picker. The robot arm has a picker arm element, with at least two further axes of movement, for moving the picker.

14 Claims, 4 Drawing Sheets

(56) References Cited

U.S. PATENT DOCUMENTS

| | | | |
|---|---|---|---|
| 5,088,610 A * | 2/1992 | Garnier | B25J 5/00 |
| | | | 212/196 |
| 5,687,831 A * | 11/1997 | Carlisle | A61F 11/12 |
| | | | 198/395 |
| 5,698,121 A * | 12/1997 | Kosaka | B23K 26/0884 |
| | | | 219/121.67 |
| 7,313,464 B1 * | 12/2007 | Perreault et al. | 700/245 |
| 8,315,739 B2 | 11/2012 | Dai | |
| 2004/0186624 A1 | 9/2004 | Oda et al. | |
| 2009/0044655 A1 * | 2/2009 | DeLouis | B25J 15/04 |
| | | | 74/490.05 |
| 2009/0238670 A1 * | 9/2009 | Helgi | A22C 17/0073 |
| | | | 414/685 |
| 2010/0272547 A1 * | 10/2010 | Cottone et al. | 414/426 |
| 2011/0211938 A1 * | 9/2011 | Eakins et al. | 414/738 |
| 2011/0223000 A1 * | 9/2011 | Martinez et al. | 414/730 |
| 2011/0223001 A1 * | 9/2011 | Martinez et al. | 414/730 |
| 2012/0009053 A1 * | 1/2012 | Boschi | B25J 15/0052 |
| | | | 414/799 |
| 2012/0215350 A1 * | 8/2012 | Murayama et al. | 700/248 |
| 2012/0259462 A1 * | 10/2012 | Aoba | B25J 9/1697 |
| | | | 700/245 |
| 2013/0211593 A1 * | 8/2013 | Domae et al. | 700/258 |
| 2014/0074288 A1 * | 3/2014 | Satou | 700/253 |
| 2016/0271791 A1 * | 9/2016 | Schultz | B25J 9/026 |

FOREIGN PATENT DOCUMENTS

| | | |
|---|---|---|
| DE | 20 2007 002 204 U1 | 5/2007 |
| DE | 10 2007 060 653 A1 | 6/2009 |

OTHER PUBLICATIONS

First Office Action (13 pages) dated Sep. 28, 2015, for Chinese Patent Application No. 201310362081.5, with partial English-language translation (14 pages).

* cited by examiner

APPARATUS FOR AUTOMATED REMOVAL OF WORKPIECES ARRANGED IN A CONTAINER

BACKGROUND OF THE INVENTION

The present invention relates to a device for the automated removal of workpieces arranged in a container. The device particularly serves the purpose of reliably and specifically removing objects from a container when the position of the objects is not known in advance. Such devices have generally been known as "Griff in die Kiste" [bin picking] devices.

Conventional devices for the automated removal of workpieces arranged in a container have a detector device for the purpose of detecting the workpieces, and a picker for the purpose of picking and removing the workpieces from the container. The picker is movable via a robot arm having six axes. In this case, a controller is included which evaluates the data of the detector device, plans the movement path of the robot arm, and controls the same accordingly. In the prior art, a standardized industrial robot is used for the purpose of moving the picker.

However, the inventors of the present invention have noticed that it is not always possible to reliably and consistently remove workpieces from a container by means of such an arrangement.

SUMMARY OF THE INVENTION

The problem addressed by the present invention is therefore that of providing devices for the automated removal of workpieces arranged in a container, which increase the process reliability for the removal of the workpieces.

According to the invention, this problem is addressed in first and second aspects of the invention by devices according to the independent claims.

Advantageous embodiments of the present invention are the subject matter of the dependent claims.

In the first aspect, a device for automated removal of workpieces arranged in a container has a detector device, for the purpose of detecting the workpieces, and a picker. The picker is able to be moved, via a robot arm having at least six axes, for the purpose of picking up and removing the workpieces from the container. In addition, a controller is included for the purpose of evaluating the data of the detector device, for planning the path, and for controlling the robot arm and the picker. According to the invention, and according to the first aspect, the robot arm has a picker arm element, for the purpose of moving the picker, having at least two further movement axes.

The inventors of the present invention have noticed that it is possible to achieve a significantly improved rate of removal by using two further movement axes—primarily when there are non-symmetrical or non-rotationally symmetric parts. In particular, by having a total of eight axes of the picker arm, it is possible to reliably remove workpieces if the same are arranged in inconvenient positions, for example at the edge of the container or far at the bottom of the container. In this case, the picker arm element according to the invention reduces the space required for picking through the box. With the accessibility increased in this way, there is also an increased rate of removal—meaning the number of the parts which can be picked without further measures. In addition, the contours which can collide with the box are reduced.

In the second aspect, the device for automated removal of workpieces arranged in a container again has a detector device for the purpose of detecting the workpieces, and a picker for the purpose of picking up and removing the workpieces from the container. In addition, a controller is included for the purpose of evaluating the data of the detector device, for planning the path, and for controlling the picker. According to the invention, and according to the second aspect, the picker can be moved via a planar surface gantry having at least two, and preferably three, linear axes, and at least two additional rotational axes.

The inventors of the present invention have noticed that, alternatively to the known robot arms from the prior art which have six swivel axes, a planar surface gantry can also be used if the same is equipped with at least two additional rotational axes.

In the second aspect, the picker is preferably arranged on a picker arm element which provides at least one, and preferably two, additional axes of movement, in addition to the three linear axes of the planar surface gantry, and optionally a further rotational axis. In place of a third linear axis, in this case, one, two, or more further rotational axes can be substituted for the linear axis.

As a result of the total of at least five axes of movement, i.e. the two linear axes with one or more rotational axes, or the three linear axes, the additional rotational axis, and the at least one further axis of movement, the picker can be controlled with a still higher degree of flexibility and precision. The further axis of movement in this case is preferably likewise a rotational axis.

In addition, a planar surface gantry equipped with the picker arm element has a total of at least two further axes of movement, in addition to the rotational axis, and particularly, two further rotational axes, such that the device has a total of at least six axes.

A picker arm element, as also used in the first aspect to equip a robot arm, can be used in this case.

The additional axes according to the invention are preferably rotational axes, meaning either rotary axes, which allow a rotational movement of 360°, or swivel axes with a smaller swivel range.

The picker arm element used according to the first or the second aspect of the invention has, in a particularly preferred manner, at least two rotational axes, and one rotational mechanism and one swivel mechanism. The rotational mechanism in this case can be arranged between the picker and the pivot mechanism.

Therefore, it is particularly preferred that a robot arm is used to move the picker in the first aspect, wherein the picker arm element is arranged on said robot arm, thereby providing two further rotational axes. According to the second aspect, it is particularly preferred that a planar surface gantry is used which has at least two or three linear axes, wherein the picker arm element is arranged on said planar surface gantry, thereby providing at least two further rotational axes. In this case, it is particularly preferred that one further rotational axis is included, particularly a rotary axis.

The present invention can be used with any pickers. The picker in this case can be a magnetic, a pneumatic, and/or a mechanical picker.

It is particularly preferred that the present invention is used with a mechanical picker, because this enables a particularly high picking precision. In addition, the additional axes included according to the invention enable a particularly exact approach of the picker to the picking zone of the workpiece being picked. In this way, the workpieces in the container can be reliably picked even in difficult picking situations.

The picker according to the invention can be a finger picker, for example a two finger picker.

In one embodiment of the invention, the picker can be arranged at an angle on the picker arm element. Such an angulate arrangement of the picker enables a simplified picking of workpieces which are arranged near to an inner wall of the container, by way of example.

The center axis of the picking zone of the picker in this case can particularly be arranged at an offset to the rotary axis of the last rotational axis.

It is particularly preferred that elements arranged farther up on the picker arm in this case do not form interfering edges with respect to the picker. In this way, the configuration prevents the picker from not being able to be moved into the desired position.

The picker according to the invention can particularly be a finger- and/or a jaw picker, the picking fingers and/or picking jaws of which are arranged on an outer edge of the picker. In this way, the picker can also reliably pick all the way to the side walls of the container. The picker in this case can be a two-finger picker and/or a two jaw picker. The connection line between the two fingers and/or the two jaws in this case is advantageously offset to the outside with respect to the rotary axis of the last rotational axis, and particularly with respect to the last rotary joint. The connection line in this case can run tangentially to the rotary axis of the last rotational axis.

In a further preferred embodiment of the present invention, the picker arm element is arranged on the robot arm and/or planar surface gantry in such a manner that only the picker arm and optionally the last swivel arm of the robot and/or of the planar surface gantry on which the picker arm is arranged needs to ever be guided into the container to pick workpieces, even if the workpiece being picked is arranged on the floor of the container. In particular, the picker arm element in this case forms a picker arm extension, wherein the length of the picker arm, optionally together with the length of the last swivel arm of the robot arm and/or of the planar surface gantry on which the picker arm is arranged, is the same or is larger than the height of the side walls of the container. The parts of the robot arms and/or of the planar surface gantry arranged further up therefore do not form any interfering edges which need to be taken into account.

The picker arm element according to the invention as used preferably has, as indicated above, a rotation mechanism and a swivel mechanism, wherein the rotation mechanism is arranged between the picker and the swivel mechanism, and therefore forms the last axis of the picker arm element.

The two rotational axes of the picker arm element in this case are preferably positioned one on top of the other perpendicularly, wherein it is particularly preferred that they cross each other. The two rotational axes in this case are preferably arranged as close to the picker as possible, such that a compact construction results.

In addition, the picker arm element preferably has such dimensions, with respect to the container and/or the workpieces which will be picked, that the picker arm element can be inserted into the container in the position necessary for picking, regardless of the position of the workpiece being picked.

For this purpose, the maximum offset K of the picker with respect to the next-to-last rotational axis, which preferably is a swivel axis, is of decisive importance.

Because the offset K of the picker, with respect to the next-to-last rotational axis, according to the swivel position of this axis, depends both on the length of the segment of the picker arm element between the last and the next-to-last rotational axis, and also the length of the segment of the picker arm element between the last rotational axis and the picker, the maximum offset K in this case is defined as the maximum distance between the outer edge of the next-to-last axis of the picker arm element and the outer edge of the picker including the picking elements.

The picker arm element preferably has the dimensions $$K<W/2$$

with respect to the container, wherein K is the maximum distance between the outer edge of the next-to-last axis of the picker arm element and the outer edge of the picker, and W is the length of the smaller lateral surfaces of the container. The container preferably has a rectangular base area in this case.

In addition, the picker arm element preferably has the dimensions $$K<(W-Bw)/2$$

with respect to the container and the workpiece, wherein Bw is the thickness of the workpiece in the direction in which the picker picks the workpiece, meaning in the direction in which the picker approaches the workpiece to pick the same. In the case of a finger picker, this would be the direction in which the picker fingers are moved into the workpiece.

In addition, the picker arm element preferably has the dimensions $$Lg<Lw$$

with respect to the workpiece, wherein Lg is the length of the picker in the direction of movement of the picking elements of the picker, particularly in the direction of the connection line between the two fingers and/or the two jaws of a two-finger picker or a two jaw picker, and Lw is the maximum length of the workpiece in a connection direction between the picking points of the workpiece.

The container and/or the workpieces in this case can be a part or parts of the device according to the invention, thereby forming a system which has these components.

In addition, according to the invention, a compensation device can be included which enables an evasive movement if the picker has a collision. Such a compensation device prevents the movement mechanism from being overloaded, and also functions so that work can continue without frequent system stops.

The compensation device is particularly designed in such a manner that it is rigid up to a certain first load limit, such that a clear position of the picker is defined with respect to the axes of movement. In this case, this first load is higher than the load exerted by the weight of the picker itself and/or of the picker arm, and/or the loads during normal operation. In this way, the compensation device is only triggered if a collision occurs.

The picker arm in this case is advantageously further moved a defined distance if a collision is detected by a triggering of the compensation device.

The compensation device is advantageously arranged in such a manner that it enables an evasive movement of the entire picker arm element according to the invention with the at least one, and advantageously at least two, further axes of movement. The compensation device in this case can be arranged between the robot arm and the picker element, and/or between the planar surface gantry and the picker arm element.

As an alternative or in addition thereto, a compensation device which is integrated into the picker arm element can also be configured for the purpose of compensating rotational movements.

According to the invention, the controller can control the two axes of the picker arm element as simple adjusting axes. In this way, despite the two additional axes, a simple control results, wherein thereby standard software can be used to control the robot arm, by way of example.

The controller can particularly calculate only the necessary end position of the axes of the picker arm element which allows the workpiece to be picked. The two axes of the picker arm element in this case preferably are positioned at their end position before the picker is moved toward the workpiece being picked.

In addition, the control can initiate the advancement of the picker toward the workpiece, by controlling the remaining axes. The remaining axes in this case are particularly controlled in such an advantageous manner that the picker is advanced toward the workpiece without a collision.

In addition, the position of the adjusting axes of the picker arm element is taken into account by the controller, only as regards the changed position of the picker with respect to the robot arm and/or the planar surface gantry and/or the interfering edges of the picker arm which are changed as a result of the adjustment of the adjusting axes.

As such, available control software can particularly be used to control the robot arm and/or the planar surface gantry, and in the process the conventional path planning can be used, wherein only the change in position of the picker, with respect to the robot arm and/or the planar surface gantry and the changed interfering edges of the picker arm, is taken into account.

As an alternative, the additional axes can be integrated into the robot controller as additional full-range NC axes, thereby allowing a synchronous movement.

The device according to the invention can particularly serve the purpose of positioning the removed workpieces at a target receptacle in an automated manner, wherein the controller moves the picker in such a manner that the workpieces are arranged directly at the target receptacle right out of the container. The additional axes according to the present invention enable the picking precision necessary for this.

The device according to the present invention can be used to manipulate any workpieces. The device according to the invention can particularly even be used to manipulate workpieces which only have one, or a certain number of, defined picking zones, wherein the picker must precisely advance toward these zones.

The workpieces in this case can be made of any material, for example of metal, plastic, or a combination of metal and plastic. In particular, these can even be workpieces which only have a picking zone in a subregion thereof. By way of example, these can be workpieces which are only made of metal in a subregion thereof, and which must be picked in this subregion by a magnetic picker.

According to the invention, the workpieces in this case can be arranged in the container without order, but can still be picked reliably. The detector device according to the invention first determines data referring to the workpieces in the container, wherein the controller identifies individual workpieces using this data, and selects a workpiece from these workpieces which will be picked. Using the position data of the workpiece selected for picking, a path planning is carried out for the axes of movement, via which the picker will be advanced toward the workpiece. In this case, a collision check is carried out during the path planning, which ensures that the picker and/or the picker arm does not collide with interfering edges during the movement toward the workpiece, such as other workpieces or the container walls.

According to the invention, an optical system can be used to detect the workpieces, wherein a laser scanner is particularly preferred, and particularly a 3D laser scanner. The detector device in this case can be arranged above the container.

It is particularly preferred that the device is controlled in such a manner that the workpieces in the container are always detected when a workpiece has been removed and placed at a target receptacle. In this way, it is possible for the next workpiece which will be picked to be identified and selected, wherein the path planning for the next picking process is then carried out using this identification and selection.

In addition to the device according to the invention, the present invention also comprises a picker arm element for a device according to the invention. The picker arm element in this case can carry a picker, and can have at least two additional axes to move the picker. The picker and/or picker arm element in this case are advantageously designed in the manner in which was described in greater detail above in the context of the device according to the invention.

The picker arm element according to the invention can have at least two rotational axes, one swivel axis and one rotary axis. In addition, the picker in this case is advantageously arranged on the picker arm element at an angle.

According to the first aspect, the present invention further comprises a method for the automated removal of workpieces arranged in a container, having the following steps: detection of the workpieces; picking a workpiece by means of a picker; and removal of the workpiece from the container. According to the invention, the picker is moved via a robot arm having at least six axes, and a further picker arm element having at least two further axes of movement.

In a second aspect, the present invention comprises a method for the automated removal of workpieces arranged in a container, having the following steps: detection of the workpieces; picking a workpiece by means of a picker; and removal of the workpiece from the container. According to this aspect, the picker is moved via a planar surface gantry having at least three linear axes and at least one additional rotational axis. It is particularly preferred that a picker arm element having at least one, and preferably two axes of movement, is used in addition to the rotational axis, for the purpose of moving the picker.

The two methods according to the invention are advantageously carried out in this case as described above. In particular, the two further axes of movement of the picker arm element can function simply as adjusting axes, while the actual picking movement of the picker occurs as usual, via the six axes of the robot arm and/or via the planar surface gantry. As an alternative, the two further axes of movement can be integrated into the robot controller as full-range NC axes, thereby allowing a synchronized movement.

It is particularly preferred that the methods according to the invention are carried out using a device according to the invention as described above.

The present invention further comprises a computer program for carrying out one of the methods according to the invention, as described above. In particular, the computer program can be a computer program for the purpose of implementing a controller for a device as described above. The computer program according to the invention can be saved on a data storage device or in a memory device of a controller, by way of example.

The present invention is described below in greater detail with reference to certain embodiments and to the drawings.

DETAILED DESCRIPTION OF THE INVENTION

Figure 1:
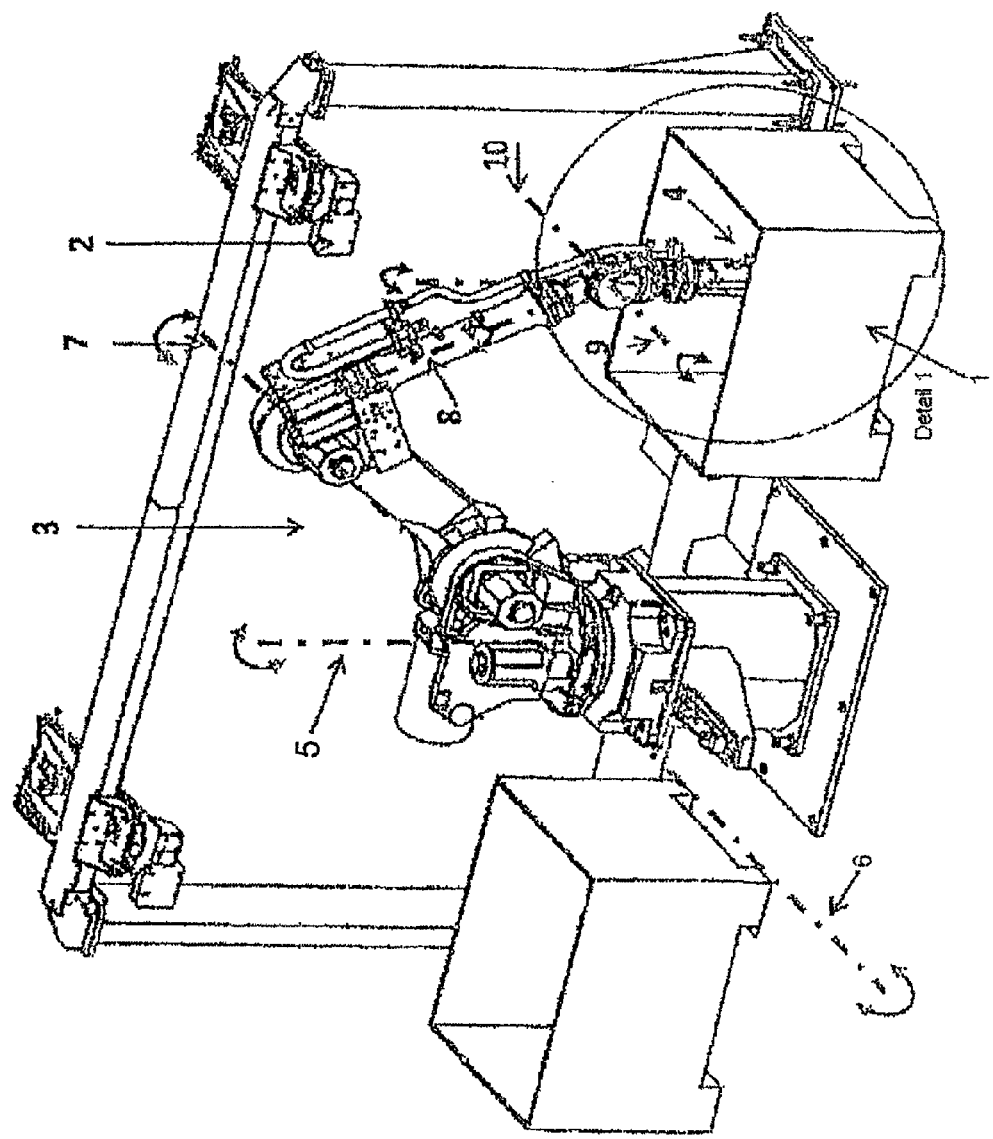
FIG. 1 shows a first embodiment of a device according to the invention, wherein the picker is arranged on a six-axis industrial robot via a picker element having two further axes of movement.
Figure 3:
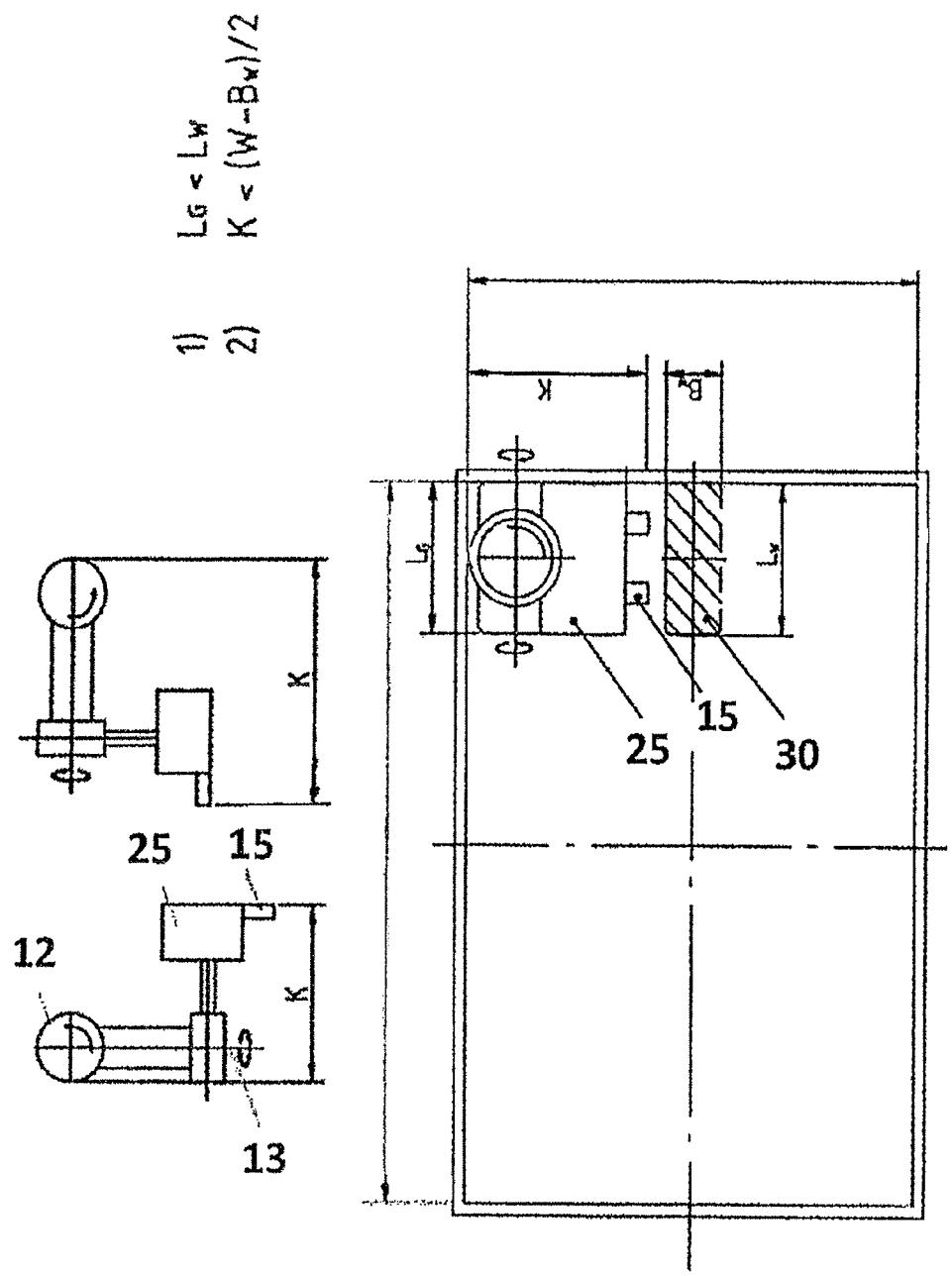
FIG. 3 shows an illustration used to explain the dimensions of a picker arm element according to the invention with respect to the dimensions of a container and/or the workpieces.

FIGS. 1 and 3 show embodiments of a device according to the invention which serves the purpose of removing workpieces arranged in a container 1. The workpieces in this case are particularly arranged without order in the container 1.

In this case, a detector device 2 is included which detects the workpieces positioned in the container. This can be a laser scanner, and particularly a 3D laser scanner. The detector device is arranged above the container, and therefore looks into the same. According to the invention, a controller is included which evaluates the data generated by the detector device 2. In this way, the workpieces positioned in the container are identified, and one workpiece which is suitable for being picked is selected. A path planning for the movement path of the picker is then carried out on the basis of the position data of the selected workpiece.

The picker in the embodiment shown in FIG. 1 is controlled via an industrial robot 3, the robot arm of which has six axes. The robot arm in this case is particularly arranged on a platform via a first vertical rotary axis 5, wherein a first swivel arm is arranged on a base element of the robot arm via a swivel axis 6. A second swivel arm is arranged on the first swivel arm via a swivel axis 7. This swivel arm has a rotary axis 8, and carries a further swivel axis 9. A third swivel arm is arranged thereon, and in turn has a rotary axis 10. According to the invention, a picker arm element 4 is then arranged on the end of this robot arm, and has two further axes of movement. A picker is then arranged on the end of the picker arm element, wherein the workpiece can be picked up by means of the same.

The picker in the embodiment is a mechanical picker. However, as an alternative, a magnetic or pneumatic picker could also be used.

The two further axes of movement of the picker arm element according to the invention even enable workpieces to be picked which are arranged in a position entirely on a side wall of the box 1, and therefore could not be properly picked without the additional axes. In particular, it is thereby possible to even pick workpieces which have only one single possible picking zone, which must be approached exactly from the correct direction.

According to the invention, the control can be carried out in such a manner that the two additional axes of the picker arm element are controlled as simple adjusting axes. The controller therefore only calculates the end position of the last two axes required to pick the selected workpiece. The two axes of the picker arm element are then moved into the calculated end position prior to the actual picking process.

For the control of the robot arm 3, the position of the two axes of movement of the picker arm element are then only taken into account as far as the zero point position of the picker as thereby changed is concerned—meaning the changed position of the picker relative to the last swivel arm of the robot arm, and also the interfering edges formed as a result. Otherwise, the path planning for the movement of the picker for the picking process is carried out using the typical six axes of the robot arm, and can therefore be carried out by the standard software of the robot.

As an alternative, the additional axes can be integrated into the robot controller as additional full-range NC axes, and therefore can allow a synchronous movement.

Figure 2:
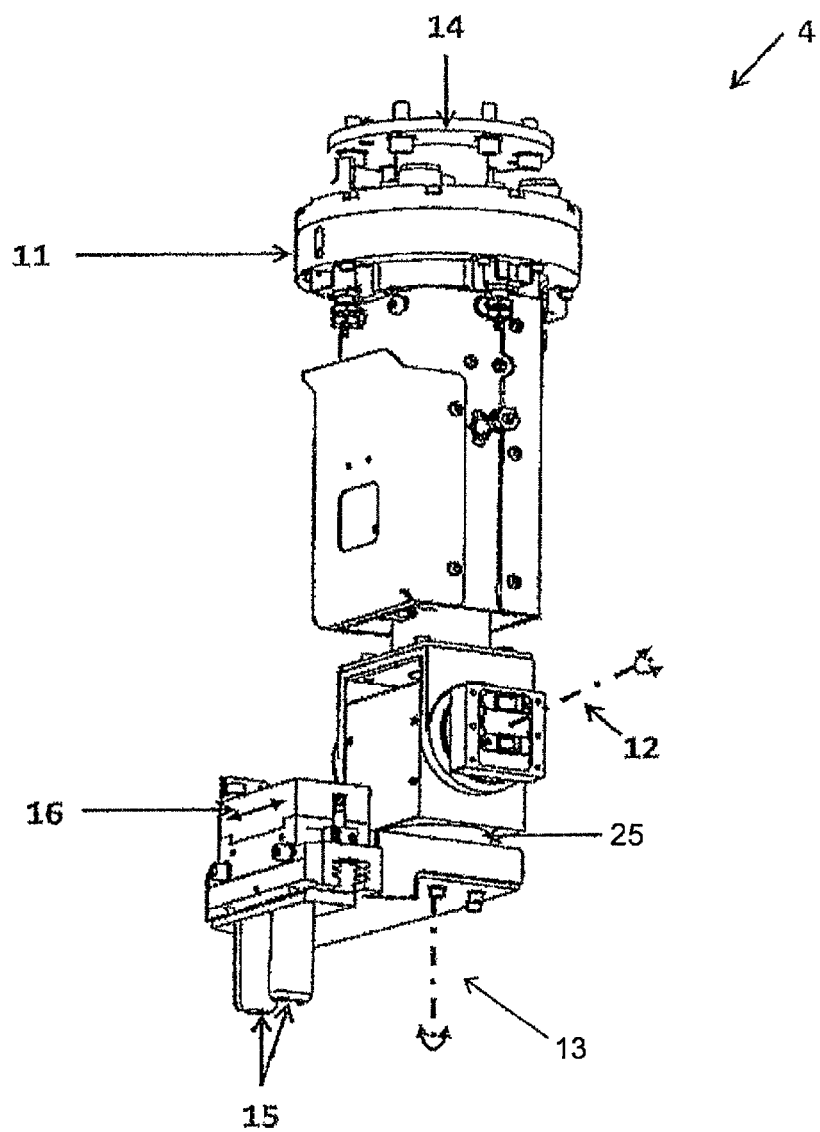
FIG. 2 shows a detailed view of the picker arm element used in FIG. 1.

One preferred embodiment of the picker arm element 4 according to the invention is illustrated in FIG. 2. This can be connected to the end of the robot arm via the connector device 14.

The two axes of movement in this embodiment are rotational axes. In particular, one swivel axis 12 is included which is positioned in the embodiment perpendicularly on the last rotary axis 10 of the robot arm. In addition, a rotary axis 13 is included which is then positioned perpendicularly on the swivel axis 12.

The picker arm element is furthermore equipped with a compensation device 11 which is arranged between the robot arm and the first axis of movement of the picker arm element. The compensation device 11 therefore enables a certain evasive movement of the complete picker arm element when the picker collides with interfering edges.

According to the invention, the picker arm element forms a picker arm extension, wherein the majority of the robot arm itself need not be guided into the container at all, and therefore also does not form any interfering edges which need to be taken into account. In this case, the two axes of movement are preferably arranged under the end of the picker arm element. The robot arm in this case must preferably be advanced into the container beyond the swivel axis 9, meaning up until the last swivel arm, and therefore does not form any interfering edges.

In this embodiment, the picker is a mechanical picker with two picker fingers 15 which can be moved via a drive 16 toward each other and away from each other. The picker fingers 15 in this case are arranged on the outer edge of the picker arm element, such that the picker arm element has no interfering edges which would project beyond the outer side past the picker fingers 15. The connection line of the picker fingers 15, and therefore the direction of the movement of the picker fingers, runs tangentially to the rotary axis 13.

In addition, the picker is arranged on the picker arm element at an angle. The picker in this case is particularly arranged at a lateral offset with respect to the last rotary axis 13. The connection line of the picker fingers 15 in this case is preferably displaced outward with respect to the rotary axis 13. In this way, workpieces which are arranged close to a side wall, for example, can nevertheless be easily picked.

As such, the picker can be advanced all the way to the side wall of the container, while the remaining picker arm element still has a sufficient separation from the side wall.

As explained in greater detail in the context of FIG. 3, the picker arm element in this case has dimensions, with respect to the container and/or to the workpieces which will be picked, such that the picker arm element can be inserted into the container regardless of the position of the workpiece being picked inside the container, in the picking position required for the picking process.

The container 1 in this case has a rectangular base area, wherein the length of the longer lateral surface of the container is indicated by L, and the length of the shorter lateral surface is indicated by W. The workpiece 30 has, in the direction in which the picker makes the picking movement toward the workpiece, a thickness Bw, and a length Lw which is perpendicular to this thickness Bw in the direction of the connection line of the two picking points at which the picking fingers of the picker come into contact with the workpiece.

The maximum offset K of the picker, with respect to the swivel axis 12, is decisively important for the maneuverability of the picker in this case. The two small figures in FIG. 3 illustrate how the offset K of the picker with respect to the swivel axis 12 depends on the swivel position of this axis. The maximum offset is therefore the value which results when the swivel axis is in the least favorable position, and hereby particularly constitutes the maximum distance between the outer edge of the swivel axis 12 and the outer edge of the picker 25, including the picker fingers 15.

The picker arm element in this case preferably has the dimensions $$K<(W-B2)/2$$

with respect to the container; as such, it can even be advanced into the box, when the workpiece 30 is arranged in the container along the narrow side, in the center, as illustrated in FIG. 3, next to the workpiece laterally.

Furthermore, the picker arm element preferably has the dimensions $$Lg<Lw$$

with respect to the workpiece, wherein Lg is the length of the picker in the direction in which the picker elements of the picker are moved, such that the picker can nevertheless be advanced toward a workpiece which is placed along a side wall as illustrated in FIG. 3.

Figure 4:
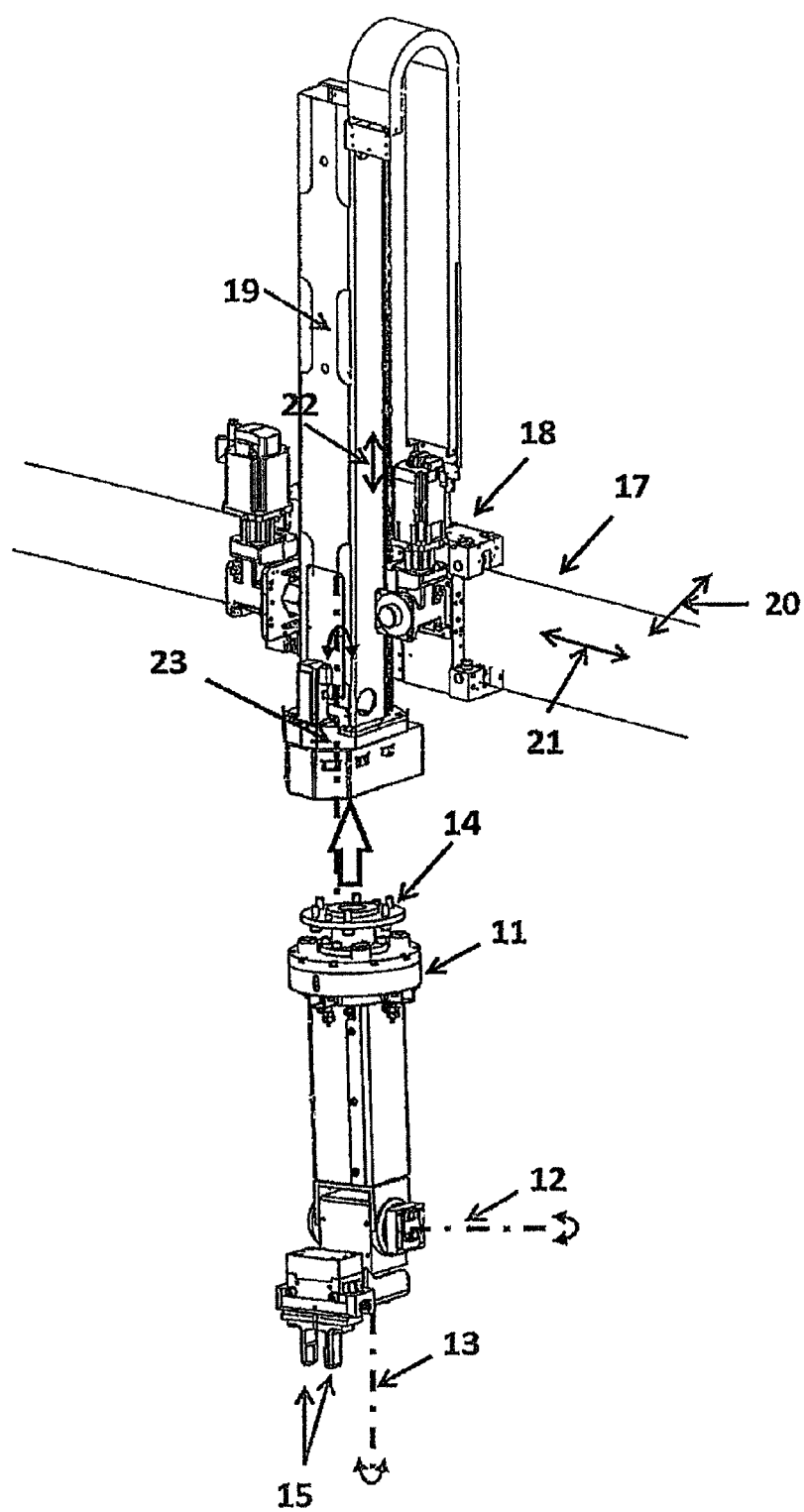
FIG. 4 shows a second embodiment of a device according to the invention, wherein a picker min element according to the invention is arranged on a planar surface gantry.

A second embodiment of the device according to the invention is illustrated in FIG. 4. In this case, there is no robot arm used for the purpose of moving the picker; rather, a planar surface gantry is used. The planar surface gantry in this case has three linear axes of movement 20 to 22. A gantry beam 17 which can be moved laterally is particularly included, wherein a carriage 18 can be moved along with axis 21 on the gantry beam 17. A beam 19 can in turn be moved on the carriage 18 along the vertical axis 22.

The picker arm element shown in FIG. 2, having two further axes of movement, is then arranged on this planar surface gantry via a rotational axis 23, which is a rotary axis. In the embodiment shown in FIG. 4, six axes of movement, i.e. three linear axes of movement and three rotational axes of movement, are therefore used for the purpose of moving the picker.

However, as an alternative, one of the three rotational axes of movement could be dispensed with—for example the rotational axis 23 or one of the two axes of the picker arm element. In simpler applications, this is adequate for reliably and specifically picking workpieces.

As an alternative to the use of a planar surface gantry with three linear axes, a planar surface gantry having only 2 linear axes could also be used, wherein the missing linear axis is replaced by one or more further rotational axes, particularly two or three rotational axes. In this case, the z-axis of the planar surface gantry shown in FIG. 4 could be replaced in this manner.

The control of the second embodiment can be carried out in an analogous manner to that of the first embodiment. In particular, the axes of the picker arm element and/or the additional rotational axis can be operated simply as adjusting axes here as well, while the actual advancement toward the workpiece takes places via the planar surface gantry.

As such, the present invention enables a reliable picking of workpieces which can therefore be directly removed from a container and placed at a target receptacle.

In addition, it is possible to achieve a 100% emptying of the container by means of the present invention.

The invention claimed is:

1. A device for automated removal of workpieces arranged in a container, comprising:
    a detector device for detecting a workpiece,
    a robot arm having a last swivel arm, an end element, and at least six axes of movement, wherein a position and orientation of the end element of the robot arm can be set by controlling the at least six axes of movement of the robot arm, the at least six axes of movement comprising a last rotational axis by which the end element of the robot arm is connected to the last swivel arm of the robot arm,
    a picker arm element attached to the end element of the robot arm, the picker arm element comprising:
        a first member connected to the end element of the robot arm, the first member having a longitudinal shape extending parallel to the last rotational axis of the robot arm,
        a second member pivotably connected to the first member via a swivel axis of movement comprising a swivel mechanism, wherein the swivel axis of movement allows a pivotal movement of the second member relative to the first member in a swivel range of less than 360° and is arranged perpendicular to the last rotational axis of the robot arm and the longitudinal direction of the first member, and
        a third member rotatably connected to the second member via a rotary axis of movement comprising a rotary mechanism, wherein the rotary axis of movement allows a rotational movement of the third member relative to the second member in a rotational range that is larger than the swivel range of the swivel axis, and wherein the rotary axis is arranged perpendicular to the swivel axis,
    a picker, attached to the third member of the picker arm element, that can be moved, via the robot arm having at least six axes and the picker arm element, for picking up and removing the workpiece from the container, and
    a controller for evaluating data of the detector device, path planning, and controlling the robot arm, the picker arm element and the picker.

2. The device according to claim 1, wherein the picker is a two-finger mechanical picker or a two-jaw mechanical picker, wherein the fingers or the jaws are arranged at an outer edge of the picker, and wherein a connection line between the fingers or the jaws is displaced outward with respect to the rotary axis of movement.

3. The device according to claim 2, wherein the picker is arranged with an offset on the third member of the picker arm element, wherein a center axis of the picker is arranged at an offset with respect to the rotary axis, and wherein elements farther up on the picker arm element do not form interfering edges for the picker.

4. The device according to claim 1, wherein the picker arm element has such dimensions, with respect to at least one of the container and the workpieces that the picker arm element can be inserted into the container, regardless of the position of a workpiece that will be picked up inside the container, in a picking position required for picking the workpiece up.

5. The device according to claim 1, wherein the picker arm element has dimensions satisfying $$K<W/2$$

with respect to the container, wherein K is a maximum distance between an outer edge of the swivel mechanism of the picker arm element and an outer edge of the picker, and W is a length of a smaller lateral surface of the container.

6. The device according to claim 5, wherein the picker arm element has dimensions satisfying $$K<(W-Bw)/2$$

with respect to the container and the workpiece, wherein Bw is a thickness of the workpiece in a direction in which the picker picks up the workpiece.

7. The device according to claim 2, wherein the picker arm element has dimensions satisfying $$Lg<Lw$$

with respect to the workpiece, wherein Lg is a length of the picker in a direction of a connection line between the fingers or the jaws of the picker, and Lw is a maximum length of the workpiece in a connection direction between picking points of the workpiece.

8. The device according to claim 1, wherein the picker is at least one of a finger picker having two fingers and a jaw picker having two jaws, the fingers, jaws, or fingers and jaws of which are arranged on an outer edge of the picker, and wherein the picker arm element is arranged on the robot arm in such a manner that only the picker arm element and the last swivel arm of the robot arm on which the picker arm element is arranged needs to ever be guided into the container to pick workpieces, even if a workpiece being picked is arranged on the floor of the container, wherein at least one compensation device can be included to allow an evasive movement if the picker has a collision, wherein the compensation device enables an evasive movement of the entire picker arm element, and wherein the compensation device is part of the picker arm element and defines a compensation device for compensating rotary movements, swivel movements, or both rotary and swivel movements.

9. The device according to claim 1, wherein the controller controls the rotary axis and the swivel axis of the picker arm element as simple adjusting axes, wherein the controller can calculate only a necessary end position of these axes which allows a workpiece to be picked, and the controller initiates advancement of the picker toward the workpiece by controlling the at least six axes of the robot arm, wherein the position of the rotary axis and the swivel axis of the picker arm element is taken into account by the controller only as far as a changed position of the picker with respect to the end element of the robot arm and changed interfering edges of the picker arm is concerned.

10. The device according claim 1, wherein the workpieces are positioned at a target receptacle in an automated manner, with the controller moving the picker in such a manner that the workpieces are arranged directly at the target receptacle right out of the container.

11. A picker arm element for a device according to claim 1, wherein the picker arm element includes a drive for moving picker fingers of the picker toward and away from each other.

12. The device according to claim 1, wherein, in a first swivel position of the swivel axis, the direction of the rotary axis runs parallel to the longitudinal direction of the first member and the direction of the last rotational axis of the robot arm, and the swivel range comprises sub-ranges extending to both sides of the first swivel position for swiveling in at least a second and a third swivel positions where the direction of the rotary axis runs at opposite angles to the longitudinal direction of the first member and the direction of the last rotational axis of the robot arm.

13. The device according to claim 1, wherein the swivel axis and the rotary axis of the gripper arm element pass through each other in a plane.

14. The device according to claim 1, wherein the picker is a mechanical picker having at least two fingers arranged at an offset with respect to the rotary axis on the third member and movable relative to each other for gripping a workpiece, and a direction of movement of the fingers for gripping a workpiece runs tangentially to the rotary axis of movement.

* * * * *